United States Patent [19]

Yumde et al.

[11] 4,004,082
[45] Jan. 18, 1977

[54] METHOD AND SYSTEM FOR MULTIPLEXING SIGNAL FOR TRANSMISSION

[75] Inventors: Yasufumi Yumde; Takashi Furuhata; Kotaro Kawamura, all of Yokohama, Japan

[73] Assignee: Hitachi, Ltd., Japan

[22] Filed: Sept. 30, 1974

[21] Appl. No.: 510,630

[30] Foreign Application Priority Data

Oct. 1, 1973  Japan .......................... 48-109275

[52] U.S. Cl. .......................... 358/141; 178/DIG. 3; 178/69.1; 328/63; 332/11 R; 358/148
[51] Int. Cl.² .................. H04N 7/12; H03K 1/17; H03K 7/00
[58] Field of Search ............... 178/69.5 TV, 69.5 P, 178/68, 6.8, DIG. 3, 6, 69.5 R; 307/234, 236, 269; 328/57, 61, 63; 332/9 R, 11 R; 329/107; 179/2 TV, 15 AW; 325/141–143, 38 A

[56] References Cited

UNITED STATES PATENTS

| | | | |
|---|---|---|---|
| 2,700,696 | 1/1955 | Barker | 178/68 |
| 2,996,578 | 8/1961 | Andrews | 325/384 |
| 3,048,819 | 8/1962 | Helder et al. | 340/146.1 |
| 3,057,962 | 10/1962 | Mann et al. | 178/69.5 R |
| 3,162,857 | 12/1964 | Sanders | 325/143 |
| 3,244,808 | 4/1966 | Roberts | 178/6 |
| 3,484,547 | 12/1969 | Schaefrer | 178/6 |

*Primary Examiner*—John C. Martin
*Attorney, Agent, or Firm*—Craig & Antonelli

[57] ABSTRACT

A signal multiplexing method and system for transmitting a television signal by a narrow-band transmission medium incapable of transmitting d.c. components. In this method, a two-polarity pulse train signal consisting of pulses of alternately inverted polarities is subject to pulse modulation by the video information only of the television signal. The horizontal and vertical synchronizing signals indicative of the beginning of a line, field or the like are coded in such a form that some of the successive pulses in the pulse train signal have the same polarity.

13 Claims, 7 Drawing Figures

METHOD AND SYSTEM FOR MULTIPLEXING SIGNAL FOR TRANSMISSION

BACKGROUND OF THE INVENTION

1. FIELD OF THE INVENTION

This invention relates to a method and system for multiplexing a signal for transmission. More particularly, this invention relates to a method and system of the kind above described which can be applied to a transmission means incapable of transmitting d.c. components such as a recording and reproducing system using a magnetic recording medium so that a signal including such d.c. components can be transmitted and which are also suitable for transmission of a plurality of information.

2. DESCRIPTION OF THE PRIOR ART

One of known methods for transmitting a signal comprises subjecting a pulse signal to pulse position modulation, pulse interval modulation, pulse width modulation, pulse amplitude modulation or the like by the signal to be transmitted. Further, it is known that a pulse signal consisting of pulses of positive and negative polarities is advantageously used as a carrier signal when it is desired to transmit a signal with high fidelity by use of a transmission medium incapable of transmitting d.c. components such as one used in a magnetic recording and reproducing system or by use of a transmission medium in which a signal transmitted is susceptible to amplitude variations.

A method of transmission utilizing a pulse signal as a carrier as above described can be effectively used when a wide-band video signal is converted into a narrow-band signal for the transmission of the video signal by a narrow-band magnetic recording and reproducing system or by a transmission means adapted for the transmission of an audio signal. In the case of transmission of such narrow-band signal, the period of time required for the transmission is very long compared with that required for the original signal due to the fact that a pulse signal having a low pulse recurrence rate is generally employed as the carrier. When a signal to be transmitted is a television signal which consists of a video information signal, a horizontal synchronizing signal and a vertical synchronizing signal, transmission of this television signal by directly converting same into a narrow-band pulse signal results in the existence of a dead transmission time. More precisely, the synchronizing signals in the television signal are also extended in respect of time, and the period of time occupied by these synchronizing signals relative to the actually required video information provides a dead time.

SUMMARY OF THE INVENTION

It is an object of the present invention to provide a method and system for multiplexing a signal for transmission which make possible to transmit two or more kinds of information including d.c. components even by a transmission means incapable of transmitting such d.c. components.

Another object of the present invention is to provide a method and system of the above character which can transmit without any substantial dead time a wide-band signal converted into a narrow-band signal and including two or more kinds of information therein.

Still another object of the present invention is to provide a method and system of the above character which are suitable for efficient transmission of a television signal converted into a narrow-band signal.

Yet another object of the present invention is to provide a method and system of the above character which are suitable for recording and reproduction of a television signal converted into a narrow-band signal by means of a magnetic recording medium of the type used for recording and reproduction of an audio signal.

In the present invention which attains the above and other objects, there is provided a pulse signal consisting of a train of pulses of alternately positive and negative polarities which is pulse-position-modulated, pulse-interval-modulated, pulse-width-modulated, pulse-amplitude-modulated or the like-modulated by an information signal of one kind among two or more kinds of information signals included in a signal to be transmitted.

Then, the polarity of a part of the pulses in the modulated pulse train signal is inverted or a part of the pulses in the modulated pulse train signal is eliminated in response to the application of another information signal. In this manner, a part of the pulse train signal modulated by one of the information signals is coded to represent another information signal.

In the case of, for example, a video signal, the video information signal in the vidio signal is subject to sampling, and a pulse train signal consisting of pulses of alternately inverted polarities is subject to pulse modulation depending on the individual amplitude values of the sampled video imformation signal, that is, depending on the brightness levels of the individual picture elements of the video information signal. Then, those pulses, for example, two adjacent pulses lying in this pulse train signal at the positions corresponding to the positions of the vertical and horizontal synchronizing signals are rendered to have the same polarity. Thus, the successive pulses of the same polarity can be easily distinguished from the train of pulses representing the video information signal since the pulse train representing the video information signal consists of pulses of alternately inverted polarities, and such signal portions can be used as the synchronizing signals.

DESCRIPTION OF THE PREFERRED EMBODIMENTS

Figure 1:
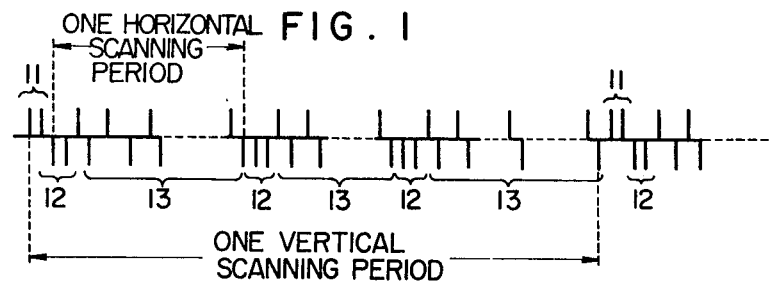
FIG. 1 shows a waveform of a signal obtained by the method according to the present invention.

FIG. 1 shows one example of a pulse signal which consists of a train of pulses of positive and negative polarities and is modulated by a video signal according to a method of the present invention. FIG. 1 illustrates the case in which such pulse signal is subject to pulse interval modulation by a video information signal. A video signal includes two kinds of synchronizing signals, that is, a horizontal synchronizing signal and a vertical synchronizing signal. Thus, it is necessary to multiplex these two kinds of signals in addition to the video information signal. These two kinds of signals may be multiplexed in various ways. According to a simplest method, a set of two adjacent pulses may be rendered to have the same polarity in the positive direction and another set of two adjacent pulses may be rendered to have the same polarity in the negative direction.

Referring to FIG. 1, two successive pulses 11 of positive polarity are included in the head of the video signal portion corresponding to one field and are coded to provide the vertical synchronizing signal. Two successive pulses 12 of negative polarity are included in the head of the video signal portion corresponding to one horizontal scanning line and are coded to provide the horizontal synchronizing signal. A pulse train 13 represents the video information. In the form shown in FIG. 1 2 bits are used for the purpose of coding of two kinds of information. However, more bits may be used to constitute a polarity pattern which can be distinguished from the video information signal so that more kinds of information can be suitably coded.

In a transmission means which cannot transmit d.c. components, a succession of such pulses of the same polarity may result in a sag since a d.c. component appears during this period of time. However, any substantial problem would not arise when the number of bits of such successive pulses of the same polarity is small. Especially, in the case shown in FIG. 1, any appreciable sag does not occur due to the fact that the period of time occupied by the synchronizing signals is extremely short compared with the video imformation.

Besides the pulse interval modulation above described, other forms including pulse position modulation (PPM), pulse width modulation (PWM), pulse amplitude modulation (PAM) may be applied for modulating the pulse signal by the video information. However, the pulse interval modulation is most preferred for the most effective use of transmission time.

A method of coding for obtaining such a multiplex signal will be described with reference to an embodiment of the present invention in which pulse interval modulation is principally resorted to.

Figure 2:
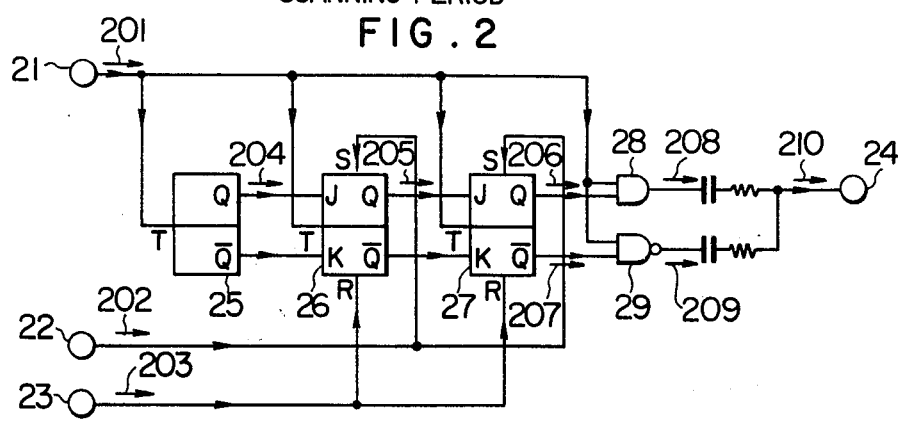
FIG. 2 is a block diagram of an embodiment of the system according to the present invention.
Figure 3:
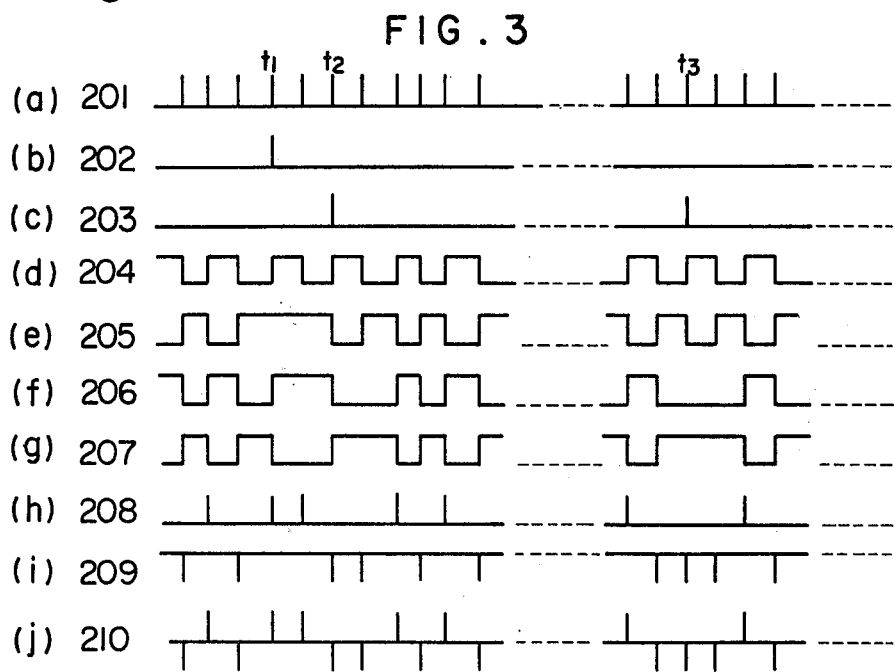
FIG. 3 is a timing chart illustrating the operation of the circuit shown in FIG. 2.

FIG. 2 is a block diagram of such an embodiment of the system according to the present invention, and FIG. 3 is a timing chart illustrating the operation of the circuit shown in FIG. 2. Referring to FIG. 2, a pulse signal 201 which consists of a train of pulses of single polarity and which is subject to pulse modulation by a video information signal is applied to an input terminal 21 in a waveform as shown in FIG. 3a. A vertical synchronizing signal 202 as shown in FIG. 3b is applied to another input terminal 22, and a horizontal synchronizing signal 203 as shown in FIG. 3c is applied to another input terminal 23. Means for obtaining the pulse train signal subject to pulse interval modulation by the video information signal and applying such modulated signal to the input terminal 21 may be the means invented by Y. Yumde et al and disclosed in Ser. No. 379,950 filed in the United States Patent Office on July 17, 1973, now U.S. Pat. No. 3,883,685.

The reference numeral 25 designates a triggered flip-flop circuit (hereinafter abbreviated as a T flip-flop circuit), and the reference numerals 26 and 27 designate JK flip-flop circuits provided with a set terminal and a reset terminal (hereinafter abbreviated as JK flip-flop circuits).

In response to the application of the modulated pulse train signal 201 shown in FIG. 3a to the T flip-flop circuit 25, a pulse signal 204 in which high and low levels alternate in response to the successive pulses in the pulse train signal 201 as shown in FIG. 3d appears at the output terminal Q of the T flip-flop circuit 25. This output signal 204 of the T flip-flop circuit 25 is applied to the JK flip-flop circuit 26, and the output signal 205 (FIG. 3e) of the JK flip-flop circuit 26 is applied to the JK flip-flop circuit 27. The modulated pulse train signal 201, vertical synchronizing signal 202 and horizontal synchronizing signal 203 are applied to the terminal T, set terminal S and reset terminal R respectively of the JK flip-flop circuits 26 and 27. When no signals are applied to the set terminal S reset terminal R, the pulses in the output signal 204 of the T flip-flop circuit 25 are successively shifted to the JK flip-flop circuits 26 and 27 with the modulated pulse train signal 201 used as clock pulses. The output signal 206 (FIG. 3f) appearing at the output terminal $\overline{Q}$ of the JK flip-flop circuit 27 is applied to one input terminal of an AND gate 28. The modulated pulse train signal 201 is applied to the other input terminal of the AND gate 28 so that a pulse signal 208 (FIG. 3h) consisting of a train of pulses of positive polarity appears from the AND gate 28 as the logical product of the two input signals. An output signal 207 (FIG. 3g) which is an inversion of the output signal 206 appears at the output terminal Q of the JK flip-flop circuit 27 to be applied to one input terminal of a NAND gate 29. The modulated pulse train signal 201 is applied to the other input terminal of the NAND gate 29 so that a pulse signal 209 (FIG. 3i) consisting of a train of pulses of inverted or negative polarity appears from the NAND gate 29 as the logical product of the two input signals. These two pulse train signals 208 and 209 are combined together to obtain a pulse signal 210 consisting of a train of pulses of positive and negative polarities as shown in FIG. 3j and this pulse train signal 210 appears at an output terminal 24. This pulse train signal 210 is in the form of a train of pulses of alternately positive and negative polarities when no signals are applied to the input terminals 22 and 23.

Suppose that the vertical synchronizing signal 202 shown in FIG. 3b is applied to the input terminal 22 at time $t_1$. Then, the JK flip-flop circuits 26 and 27 are set and the outputs appearing at the respective output terminals Q have a high level irrespective of the previous state. Thus, the output signal 205 appearing at the output terminal Q of the JK flip-flop circuit 26 has a high level after this time $t_1$ as seen in FIG. 3e. This high level persists as seen in FIG. 3e due to the fact that the ouput signal 204 of the T flip-flop circuit 25 is shifted by the next pulse in the pulse train signal 201 applied to the terminal T of the T flip-flop circuit 25. Similarly, the output signal 206 appearing at the output terminal Q of the JK flip-flop circuit 27 has a high level after the time $t_1$ as seen in FIG. 3f. Although the output signal 205 appearing at the output terminal Q of the JK flip-flop circuit 26 after the time $t_1$ is shifted by the next pulse in the pulse train signal 201 applied to the terminal T of the JK flip-flop circuit 27, the output signal 206 of the JK flip-flop circuit 27 remains in the high level as seen in FIG. 3f since the output signal 205 of the JK flip-flop circuit 26 has been in the high level.

Then, when the horizontal synchronizing signal 203 shown in FIG. 3c is applied to the input terminal 23 at time $t_2$, the JK flip-flop circuits 26 and 27 are reset and the output signals appearing at the respective output terminals Q are changed to a low level. After this time $t_2$, the output signal 205 appearing at the output terminal Q of the JK flip-flop circuit 26 is changed to a high level in response to the application of the next pulse as seen in FIG. 3e since the output signal 204 of the T flip-flop circuit 25 is shifted. Although the output signal 205 of the JK flip-flop circuit 26 is shifted in response to the next pulse applied after the time $t_2$, the output signal 206 appearing at the output terminal Q of the JK flip-flop circuit 27 remains still in the low level and two successive low levels appear necessarily as seen in FIG. 3f. Similarly, in response to the application of the horizontal synchronizing signal 203 at time $t_3$, two successive low levels appear in the output signal 206 of the JK flip-flop circuit 27 after the time $t_3$.

The output signal 207 appearing at the output terminal $\overline{Q}$ of the JK flip-flop circuit 27 is an inversion of the output signal 206 and has a waveform as shown in FIG. 3g.

The AND gate 28 provides the output signal 208 which is the logical product of the pulse train signal 201 shown in FIG. 3a and the signal 206 shown in FIG. 3f. Thus, as seen in FIG. 3h, this output 208 is a signal which consists of a train of pulses of positive polarity and in which the pulses have a short time interval only at the position at which the vertical synchronizing signal is applied. The NAND gate 29 provides the output signal 209 which is the inverted logical product of the pulse train signal 201 shown in FIG. 3a and the signal 207 shown in FIG. 3g. Thus, as seen in FIG. 3i, this output 209 is a signal which consists of a train of pulses of negative polarity and in which the pulses have a short time interval only at the position at which the horizontal synchronizing signal is applied.

Consequently, the output signals 208 and 209 respectively of the AND gate 28 and NAND gate 29 are applied to the output terminal 24 to appear as a signal as shown in FIG. 3j in which it will be seen that the vertical synchronizing signal and horizontal synchronizing signal are represented by successive pulses of positive and negative polarities respectively and the video information signal is represented by a train of pulses of alternately inverted polarities.

Such manner of multiplexing is advantageous in that it is unnecessary to cut down the video information transmission time for the transmission of the synchronizing signals. In other words, the pulses representing the position of the synchronizing signals can also represent a part of the video information, and as a result, economy of the transmission time can be achieved.

Figure 4:
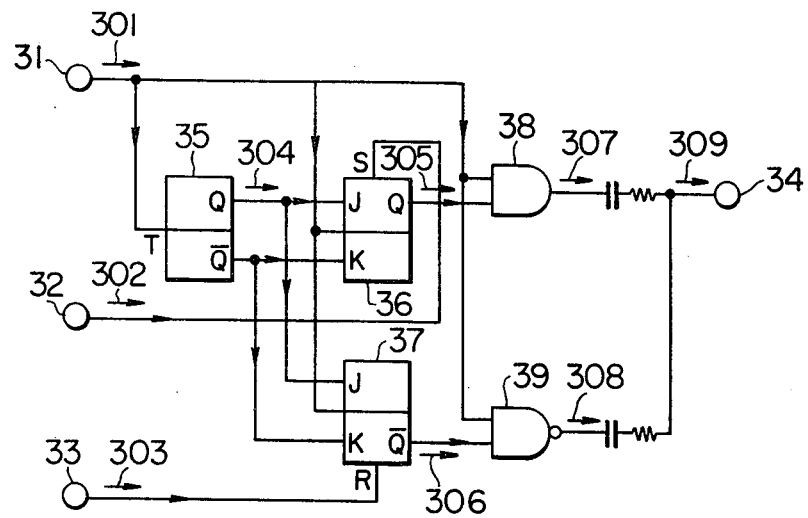
FIG. 4 is a block diagram of another embodiment of the system according to the present invention.
Figure 5:
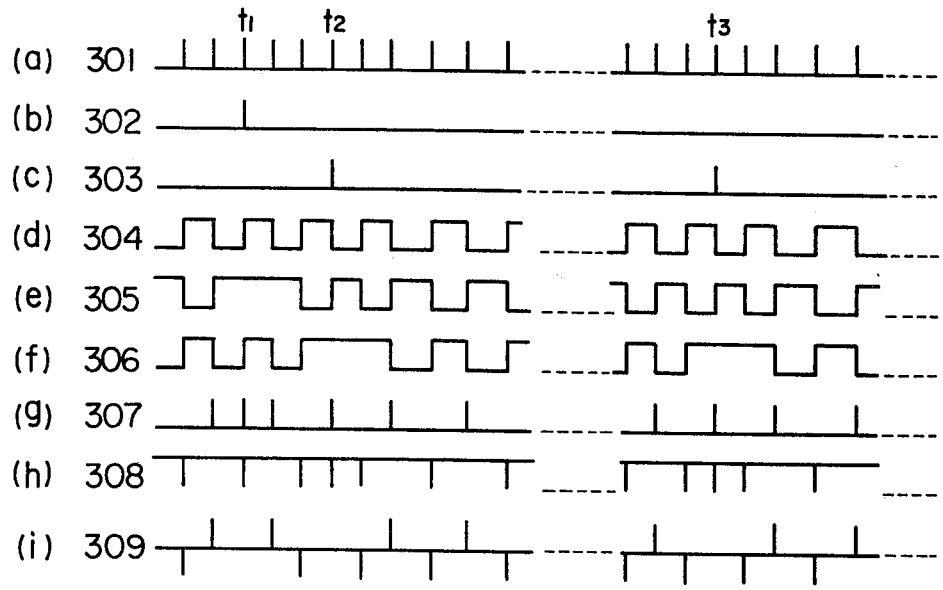
FIG. 5 is a timing chart illustrating the operation of the circuit shown in FIG. 4.

FIG. 4 is a block diagram of another embodiment of the system according to the present invention, and FIG. 5 is a timing chart illustrating the operation of the circuit shown in FIG. 4. Referring to FIG. 4, a pulse signal 301 which consists of a train of pulses of single polarity and is subject to pulse modulation by a video information signal is applied to an input terminal 31 in a waveform as shown in FIG. 5a. A vertical synchronizing signal 302 as shown in FIG. 5b is applied to another input terminal 32, and a horizontal synchronizing signal 303 as shown in FIG. 5c is applied to another input terminal 33. The pulse train signal 301 subjected to pulse position modulation or pulse interval modulation by the video information signal is applied from the input terminal 31 to the input terminal T of a T flip-flop circuit 35. In response to the application of such pulse train signal 301 to the T flip-flop circuit 35, a pulse signal 304 in which high and low levels alternate in response to the successive pulses in the input signal 301 as shown in FIG. 5d appears at the output terminal Q of the T flip-flop circuit 35. This output signal 304 of the T flip-flop circuit 35 is applied to JK flip-flop circuits 36 and 37, and the respective input signals are shifted by the pulse train signal 301 applied to their terminals T as clock pulses. Therefore, when no signals are applied to the terminals 32 and 33, a pulse signal appears at the output terminal Q of the JK flip-flop circuit 36, and this pulse signal is such that high and low levels alternate in a relation delayed by one clock pulse from those in the output signal 304 appearing at the output terminal Q of the T flip-flop circuit 35. That is, such pulse signal is an inversion of the output signal 304 of the T flip-flop circuit 35. Further, a pulse signal appears at the output terminal $\overline{Q}$ of the JK flip-flop circuit 37, and this pulse signal is an inversion of the output signal appearing at the output terminal Q of the JK flip-flop circuit 36 and is the same pulse signal as the output signal 304 of the T flip-flop circuit 35.

Suppose that the vertical synchronizing signal 302 shown in FIG. 5b is applied to the input terminal 32 at time $t_1$. Then, the JK flip-flop circuit 36 is set and the output signal 305 appearing at the output terminal Q thereof is changed to a high level after this time $t_1$ as seen in FIG. 5e. When the horizontal synchronizing signal 303 shown in FIG. 5c is applied to the input terminal 33 at time $t_2$, the JK flip-flop circuit 37 is reset and the output signal 306 appearing at the output terminal $\overline{Q}$ thereof is changed to a high level after this time $t_2$ as seen in FIG. 5f. The same occurs at time $t_3$. These two signals 305 and 306 obtained in the manner above described and the pulse train signal 301 modulated by the video information signal are applied to an AND gate 38 and a NAND gate 39 to obtain a pulse signal 307 consisting of a train of pulses of positive polarity as shown in FIG. 5g and a pulse signal 308 consisting of a train of pulses of negative polarity as shown in FIG. 5h. These two pulse train signals 307 and 308 differ from those described in the first embodiment in that a pulse of positive polarity and a pulse of negative polarity appear simultaneously in response to the application of the vertical and horizontal synchronizing signals as seen in FIGS. 5g and 5h. Thus, when these two signals 307 and 308 are added to each other, these pulses cancel each other with the result that one pulse is eliminated at the position of each synchronizing signal. Therefore, a pulse train signal 309 having a waveform as shown in FIG. 5i appears at an output terminal 34 is which the synchronizing signals are coded to provide successive pulses of the same polarity.

Figure 6:
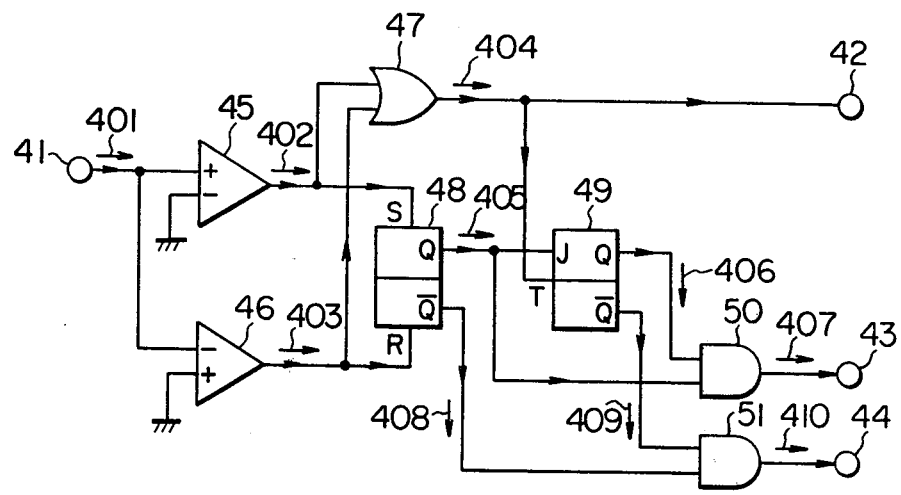
FIG. 6 is a block diagram of one form of a system preferably used for demodulation of a signal obtained by the method of the present invention.
Figure 7:
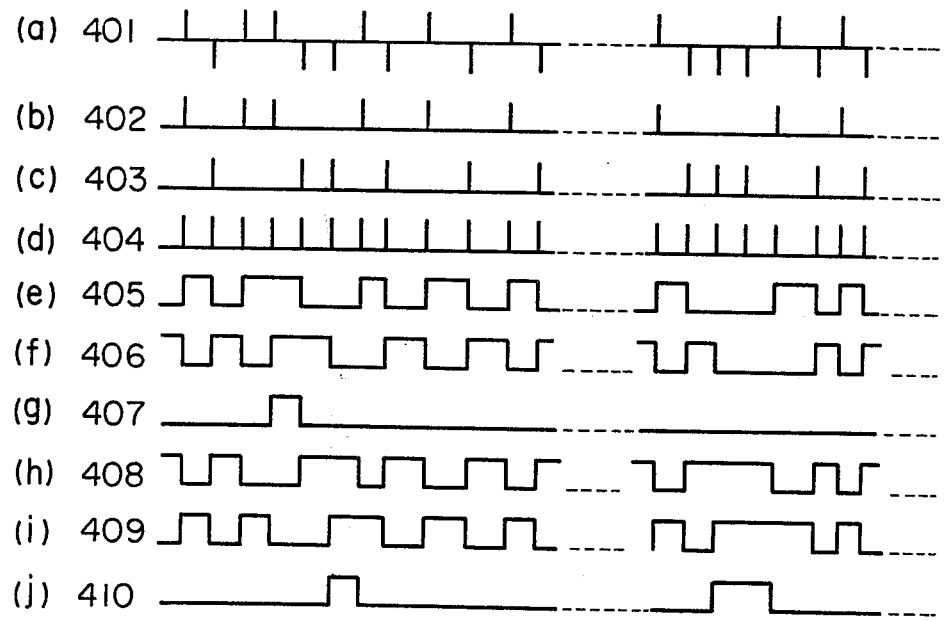
FIG. 7 is a timing chart illustrating the operation of the circuit shown in FIG. 6.

FIG. 6 is a block diagram of one form of a system which is adapted to separate the pulse train signal representing the video information from the synchronizing signals for the demodulation of the multiplex signal obtained in the manner above described, and FIG. 7 is a timing chart illustrating the operation of the circuit shown in FIG. 6. Referring to FIG. 6, a multiplex modulated pulse train signal 401 consisting of pulses of positive and negative polarities is applied to an input terminal 41, and a modulated pulse train signal 404 consisting of pulses of single polarity representing video information signal appears at an output terminal 42.

The multiplex pulse train signal 401 consisting of pulses of positive and negative polarities shown in FIG. 7a is applied from the input terminal 41 to a pair of level detectors 45 and 46. The pulses of positive polarity only are separated as shown in FIG. 7b to appear as a pulse signal 402 from the level detector 45, while the pulses of negative polarity only are separated and then inverted in polarity as shown in FIG. 7c to appear as a pulse signal 403 from the level detector 46. The output signals 402 and 403 of these two level detectors 45 and 46 are applied to an OR gate 47, and a pulse signal 404 consisting of a train of pulses of single polarity modulated by the video information signal as shown in FIG. 7d appears from the OR gate 47.

At the same time, the output signal 402 of the level detector 45 is applied to the set input terminal S of an RS flip-flop circuit 48, and the output signal 403 of the level detector 46 is applied to the reset input terminal R of the RS flip-flop circuit 48. In response to the application of these two signals 402 and 403, an output signal 405 as shown in FIG. 7e appears at the output terminal Q of the RS flip-flop circuit 48. This output signal 405 is applied to a JK flip-flop circuit 49 and the output signal 404 of the OR gate 47 is also applied to this flip-flop circuit 49 as clock pulses. As a result, a pulse signal 406 as shown in FIG. 7f appears at the output terminal Q of the JK flip-flop circuit 49 and this pulse signal 406 is such that the waveform of the output signal 405 of the RS flip-flop circuit 48 is delayed by one clock pulse. The output signal 406 appearing at the output terminal Q of the JK flip-flop circuit 49 and the output signal 405 appearing at the output terminal Q of the RS flip-flop circuit 48 are applied to an AND gate 50 to obtain a pulse 407 as shown in FIG. 7g in which it will be seen that this pulse 407 appears only when the pulses of positive polarity appear is succession in the modulated pulse train signal input 401. Therefore, the vertical synchronizing information can be derived from an output terminal 43.

An output signal 408, which is an inversion of the output signal 405 appearing at the output terminal Q of the RS flip-flop circuit 48 as shown in FIG. 7h, appears at the output terminal $\overline{Q}$ of this flip-flop circuit 48, and an output signal 409, which is an inversion of the output signal 406 appearing at the output terminal Q of the JK flip-flop circuit 49 as shown in FIG. 7i, appears at the output terminal $\overline{Q}$ of this flip-flop circuit 49. These output signals 408 and 409 are applied to an AND gate 51 to obtain a pulse 410 as shown in FIG. 7j in which it will be seen that this pulse 410 appears only when the pulses of negative polarity appear in succession in the modulated pulse train signal input 401. Therefore, the horizontal synchronizing information can be derived from an output terminal 44. In this manner, it is possible to separate individual signals in a multiplex signal obtained by changing a part of a pulse signal consisting of a train of pulses of alternately inverted polarities.

It will be understood from the foregoing detailed description of the present invention that the polarity of a part of pulses in a two-polarity pulse train signal subjected to pulse modulation by one information signal is inverted by another information signal or a part of such pulses is eliminated, and by this manner of coding, two or more information signals can be multiplexed for efficient transmission.

We claim:
1. A signal multiplexing system for the transmission of at least two kinds of information signals within an effectively reduced period of time comprising means for generating a two-polarity pulse train signal in which the time intervals between successive pulses are proportional to individual sampled values of said information signal of the first kind and the successive pulses have alternately inverted polarities, and means for inverting the polarity of a part of the pulses in said pulse train signal at a portion corresponding to the position of said information signal of the second kind thereby coding such part of said pulse train signal.

2. A signal multiplexing system for the transmission of at least two kinds of information signals within an effectively reduced period of time comprising means for generating a two-polarity pulse train signal in which the time intervals between successive pulses are proportional to individual sampled values of said information signal of the first kind and the successive pulses have alternately inverted polarities, and means for eliminating a part of the pulses in said pulse train signal at a portion corresponding to the position of said information signal of the second kind thereby coding such part of said pulse train signal.

3. A signal multiplexing system for the transmission of a composite video signal including a horizontal and a vertical synchronizing signal by a transmission medium of low frequency band comprising means for sampling the true video information signal only except said synchronizing signals in said composite video signal and generating a two-polarity pulse train signal in which the time intervals between successive pulses are proportional to the individual sampled values of said sampled video information signal and the successive pulses have alternately inverted polarities, means for generating signals representing the respective positions of said horizontal and vertical synchronizing signals, means operative in response to the application of the signal representing the position of said horizontal synchronizing signal for inverting the polarity of a part of the pulses in said train signal at a portion corresponding to the position of said horizontal synchronizing signal thereby coding such part of said pulse train signal, and means operative in response to the application of the signal representing the position of said vertical synchronizing signal for inverting the polarity of another part of the pulses in said pulse train signal at a portion corresponding to the position of said vertical synchronizing signal thereby coding such part of said pulse train signal by a code different from the code representing said horizontal synchronizing signal.

4. A signal multiplexing system for the transmission of a composite video signal including a horizontal and a vertical synchronizing signal by a transmission medium of low frequency band comprising means for sampling the true video information signal only except said synchronizing signals in said composite video signal and generating a two-polarity pulse train signal in which the time intervals between successive pulses are proportional to the individual samples values of said sampled video information signal and the successive pulses have alternately inverted polarities, means for generating signals representing the respective positions of said horizontal and vertical synchronizing signals, means operative in response to the application of the signal representing the position of said horizontal synchronizing signal for eliminating a part of the pulses in said pulse train signal at a portion corresponding to the position of said horizontal synchronizing signal thereby coding such part of said pulse train signal, and means operative in response to the application of the signal representing the position of said vertical synchronizing signal for eliminating another part of the pulses in said pulse train signal at a portion corresponding to the position of said vertical synchronizing signal thereby coding such part of said pulse train signal by a code different from the code representing said horizontal synchronizing signal.

5. A method of multiplexing for the transmission of at least two kinds of information signals comprising the steps of providing a two-polarity pulse train consisting of pulses of alternately inverted polarities modulated by a first kind of said information signal, and controlling the polarity of a part of the pulses in said modulated pulse train signal by said information signal of a second kind to thereby code such part of said pulse train signal.

6. A method of multiplexing for the transmission of at least two kinds of information signals comprising the steps of providing a two-polarity pulse train signal consisting of pulses of alternately inverted polarities modulated by said information signal of a first kind, and eliminating a part of the pulses in said modulated pulse train signal at a portion corresponding to the position of said information signal of a second kind to thereby code such part of said modulated pulse train signal.

7. A method of multiplexing for the transmission of at least two kinds of information signals comprising the steps of sampling said information signal of a first kind and modulating a pulse train signal consiting of pulses of one polarity by said sampled information signal so that the time intervals between the successive pulses in said modulated pulse train signal are proportional to the individual sampled values of said sampled information signal, converting the polarity of alternate pulses of said modulated pulse train signal, and inverting the polarity of a part of the pulses in said pulse train signal subjected to the pulse interval modulation in the preceding step at a portion corresponding to the position of said information signal of a second kind to thereby code such part of said pulse train signal.

8. A method of multiplexing for the transmission of at least two kinds of information signals comprising the steps of sampling said information signal of a first kind and modulating a pulse train signal consisting of pulses of one polarity by said sampled information signal so that the time intervals between the successive pulses in said modulated pulse train signal are proportional to the individual sampled values of said sampled information signal, converting the polarity of alternate pulses of said modulated pulse train signal, and eliminating a part of the pulses in said pulse train signal subjected to the pulse interval modulation in the preceding step at a portion corresponding to the position of said information signal of a second kind to thereby code such part of said pulse train signal.

9. A method of multiplexing for the transmission of a video information signal, a horizontal synchronizing signal and a vertical synchronizing signal comprising the steps of subjecting a pulse train signal consisting of pulses of one-polarity to pulse modulation by said video information signal, converting the polarity of alternate pulses in said pulse modulated pulse train signal, inverting the polarity of a part of the pulses in said pulse modulated pulse train signal at a portion corresponding to the inserting position of said horizontal synchronizing signal to thereby code such part of said pulse train signal and inverting the polarity of another part of the pulses in said pulse modulated pulse train signal at a portion corresponding to the inserting position of said vertical synchronizing signal to thereby code such part of said pulse train signal by a code different from the code representing said horizontal synchronizing signal.

10. A method of multiplexing for the transmission of video information signal, a horizontal and a vertical synchronizing signal comprising the steps of subjecting a pulse train signal consisting of pulses of one-polarity to pulse modulation by said video information signal, converting the polarity of alternate pulses in said modulated pulse train signal, eliminating a part of the pulses in said pulse modulated pulse train signal at a portion corresponding to the inserting position of said horizontal synchronizing signal to thereby code such part of said pulse train signal, and eliminating another part of the pulses in said pulse modulated pulse train signal at a portion corresponding to the inserting position of said vertical synchronizing signal to thereby code such part of said pulse train by a code different from the code representing said horizontal synchronizing signal.

11. A method of multiplexing for the transmission of at least two kinds of information signals comprising the steps of modulating a pulse train signal consisting of pulses of one-polarity by said information signal of a first kind, converting the polarity of alternate pulses in said modulated pulse train signal, controlling the polarity of a part of the pulses in said modulated pulse train signal by said information signal of a second kind to thereby code such part of said pulse train signal.

12. A method of multiplexing for the transmission of at least two kinds of information signals comprising the steps of modulating a pulse train signal consisting of pulses of one-polarity by said information signal of a first kind, converting the polarity of alternate pulses of said modulated pulse train signal, and eliminating a part of the pulses in said modulated pulse train signal at a portion corresponding to the position of said information signal of the second kind to thereby code such part of said modulated pulse train signal.

13. A signal multiplexing system for the transmission of a video information signal, a horizontal synchronizing signal and a vertical synchronizing signal by a transmission medium of low frequency band comprising means for sampling said video information signal and modulating a one-polarity pulse train signal by said sampled video information signal so that the time intervals between successive pulses are porportional to the individual sampled values of said sampled video information, means for converting the polarity of alternate pulses in said modulated pulse train signal, means for generating signals representing the respective positions of said horizontal and vertical synchronizing signals, means responsive to the application of the signal representing the position of said horizontal syncronizing signal for inverting the polarity of a part of the pulses in said pulse train signal at a portion corresponding to the position of said horizontal synchronizing signal to thereby code such part of said pulse train signal, and means responsive to the application of the signal representing the position of said vertical synchronizing signal for inverting the polarity of another part of the pulses in said pulse train signal at a portion corresponding to the position of said vertical synchronizing signal to thereby code such part of said pulse train signal by a code different from the code representing said horizontal synchronizing signal.

* * * * *